(12) United States Patent
Hog et al.

(10) Patent No.: US 6,229,613 B1
(45) Date of Patent: May 8, 2001

(54) OPTICAL SENSOR

(75) Inventors: Norbert Hog, Buehl; Gebhard Michenfelder, Llchtenau; Rainer Pientka, Renchen; Stefanie Lorenz, Baden-Baden, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/423,865

(22) PCT Filed: Mar. 11, 1999

(86) PCT No.: PCT/DE99/00666

§ 371 Date: Feb. 1, 2000

§ 102(e) Date: Feb. 1, 2000

(87) PCT Pub. No.: WO99/47397

PCT Pub. Date: Sep. 23, 1999

(30) Foreign Application Priority Data

Mar. 17, 1998 (DE) .............................. 198 11 531
Aug. 27, 1998 (DE) .............................. 198 38 881

(51) Int. Cl.$^7$ ...................................... G01N 21/55
(52) U.S. Cl. .................. 356/445; 250/227.25; 318/483
(58) Field of Search ................... 356/445, 239.1; 250/227.25, 227.24, 341.8; 318/483, DIG. 2, 444, 480; 73/29.01; 340/602

(56) References Cited

U.S. PATENT DOCUMENTS

| 5,391,891 | * | 2/1995 | Wiegleb et al. | ............. 250/227.25 |
| 5,498,866 | * | 3/1996 | Bendicks et al. | ............. 318/483 |
| 5,804,817 | * | 9/1998 | Seiler et al. | ............. 250/227.25 |

* cited by examiner

Primary Examiner—Hoa Q. Pham
(74) Attorney, Agent, or Firm—Michael J. Striker

(57) ABSTRACT

An optical sensor for detecting wetting of a surface in a motor vehicle, the optical sensor has a measuring segment which has at least one transmitter of electromagnet waves and at least one receiver of electromagnetic waves and in which a windshield is disposable so that when a layer of moisture forms on the windshield upon wetting from precipitation a wave propagation between the at least one transmitter and the at least one receiver changes and an output signal generated by the receiver changes, a housing disposable on an inside of the windshield and having a bottom face adapted to be in physical contact with the windshield, the bottom face of the housing being oval.

6 Claims, 1 Drawing Sheet

US 6,229,613 B1

OPTICAL SENSOR

BACKGROUND OF THE INVENTION

The invention relates to an optical sensor.

Windshield wiper systems for motor vehicles are known in which control of the windshield wipers is effected not only via a lever on the steering column but also via an optical rain sensor. The optical rain sensor typically includes a light source, whose electromagnetic radiation is reflected by the windshield differently, depending on the film of moisture on the windshield. The reflected proportion is detected by means of a photo element, so that an output signal of the rain sensor corresponding to the film of moisture can be furnished. These output signals can be evaluated in such a way and used for controlling the windshield wipers in such a way that both the turning on of the wiper system and the wiping speed are varied as a function of a measured quantity of rain.

Such rain sensors are typically disposed on the inside of the windshield. To avoid impairing the view for the driver, it is known to dispose the rain sensors in the region of an inside mirror, or in other words between the inside mirror and the windshield. The rain sensors are then disposed in a housing, which with a bottom face is in physical contact with the windshield. It is known to provide such housings with a polygonal or round bottom face. A disadvantage here is that with either a polygonal or a round bottom face, it is only with difficulty that the rain sensors can be integrated with a covering or fastening of an inside mirror; besides, they make the overall visual appearance of the arrangement less attractive. Precisely because these rain sensors are disposed at an exposed place in the motor vehicle, which can readily be seen both by someone using the vehicle and by those looking at the vehicle, the overall impression is adversely affected.

SUMMARY OF THE INVENTION

It is therefore an object of the present invention to provide an optical sensor which avoids the disadvantages of the prior art.

In keeping with these objects, one feature of present invention resides, briefly stated, in an optical sensor in which the bottom face of the housing is The optical sensor of the invention has the advantage over the prior art that it can easily be integrated into a covering of a base of an inside mirror. Because the bottom face of the housing is oval, the geometric dimensions of the housing of the optical sensor can be optimized in such a way that on the one hand, a sufficiently large bottom face for maintaining the functions of the optical sensor is available, and on the other, this bottom face is nevertheless embodied such that not only is its outer appearance suitable, but it can be integrated in a mirror base with optimal utilization of the area required. Because of the oval shaping in the bottom face, in a preferred embodiment of the invention a circuit board that carries the electronic and/or optical components of the sensor can be integrated in a space-saving way with the housing.

Particularly if, in a preferred embodiment of the invention, it is provided that the circuit board has a trapezoidal or rhomboid contour, it can be integrated optimally with the housing, without having to reserve a relatively large blind area as in the case of a round bottom face, for instance, or in other words without having to reserve an area that is not needed for disposing optical and electronic elements. The structural form of the optical sensor can thus be reduced in size, without sacrificing an attractive outer shape and appearance.

BRIEF DESCRIPTION OF THE DRAWINGS

The invention will be described in further detail below in an exemplary embodiment in conjunction with the associated drawings. Shown are.

DESCRIPTION OF THE PREFERRED EMBODIMENT

Figure 1:
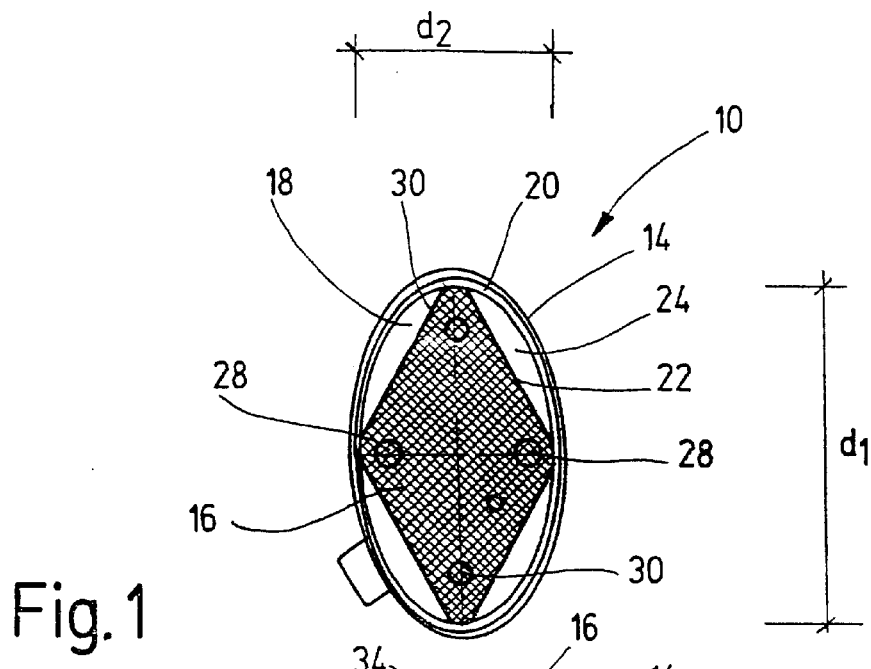
FIG. 1, a schematic bottom view of an optical sensor.
Figure 2:
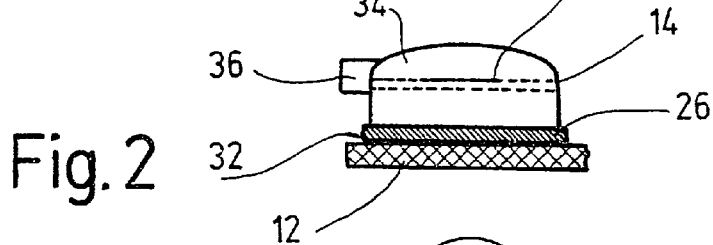
FIG. 2, a schematic side view of the optical sensor.
Figure 3:
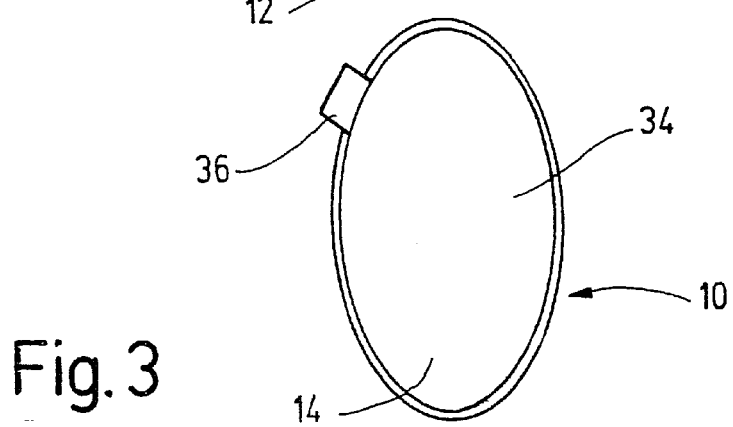
FIG. 3, a schematic top view on the optical sensor.

In FIGS. 1, 2 and 3, in different schematic views, an optical sensor 10 is shown, which is attached on the inside to a windshield 12 of a motor vehicle. Mounting the optical sensor 10 behind the windshield 12 can be done for instance by adhesive bonding at the level of an inside rear view mirror, not shown here. This positioning creates no additional hindrance to the view for a driver. The components, in particular the optical and electronic components of the optical sensor 10, are disposed in a housing 14 that is opaque in the direction of the passenger compartment.

In the housing 14, there is a circuit board 16, on which optical and electronic components, not shown individually in detail here, are mounted. Since the structure and function of an optical sensor 10, which is used as a rain sensor in motor vehicles, are known, They need not be described in further detail in the context of the present invention.

The housing 14 has an oval bottom face 18 pointing in the direction of the windshield 12. A great circle of the oval bottom face 18 has a diameter $d_1$, which is approximately twice as long as a diameter $d_2$ of a small circle of the oval bottom face 18. In adaptation to the diameters $d_1$ and $d_2$, the circuit board 16 has a rhomboid structure, so that the circuit board 16 can make optimal use of the area of the bottom face 18. Furthermore, rhomboid circuit boards 16, because of their straight edges, can be made less expensively than rounded circuit boards that are for instance adapted to the shape of the housing. A blind area 24 remaining between a housing edge 20 and a circuit board edge 22 is optimally minimized by combining the oval bottom face 18 and the trapezoidal circuit board 16.

An optical waveguide 26 is disposed in spaced-apart fashion from the circuit board and at the same time acts as a cover for the housing 14. The optical waveguide 26 has focusing structures, not individually shown in detail, with which focusing or aimed deflection of electromagnetic waves—both those received and those sent by the optical sensor 10—can be attained.

In the view in FIG. 1, transmitter diodes 28 and receiver diodes 30 are schematically shown, but they are not visible in the bottom view below the sensor 10. They serve to transmit and receive electromagnetic waves, respectively, and the optical waveguide 26 can perform the aforementioned focusing.

Attaching the optical sensor 10 to the windshield 12 is effected via a frame on the window and of the sensor housing clipped or clamped therein, or via a transparent adhesive film 32. The adhesive film 32 can be embodied as a film that is adhesive on both sides, with the side of the film toward the windshield 12 initially being provided with a backing film. This backing film on the one hand protects the optical waveguide 26 during shipping before installation, and on the other, when peeled off, reveals the adhesive layer for the nonpositive attachment to the windshield 12.

In the side view shown in FIG. 2, it becomes clear that the housing 14 has a slightly curved basic body 34, from which a plug 36 leads laterally to the outside. The circuit board 16, which is disposed spaced apart from the optical waveguide 26, is indicated by dashed lines here inside the housing 14. The plug 36 serves the purpose of electrical connection of the sensor 10 to evaluation electronics, not shown here. Depending on the design of the sensor 10, coupling with an evaluation array may also be done optically by means of optical waveguides.

FIG. 3 shows a top view on the sensor 10, which corresponds to the inside view in the motor vehicle. Once again, the attractive visual design because of the oval bottom face 18 of the housing 14 becomes clear.

Figure 4:
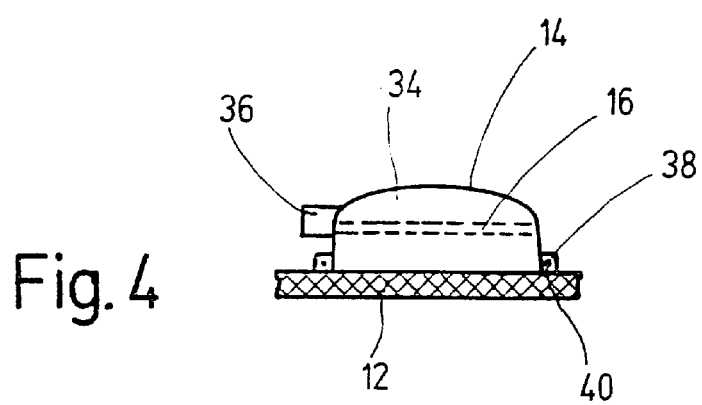
FIG. 4, an alternative possibility for attaching the sensor.

FIG. 4 shows a further option for attaching the sensor 10 to the windshield 12. A frame 38 is attached to the windshield 12, for instance by adhesive bonding. The housing 14 of the sensor 10 is secured in the frame 38. The housing 14 can for instance be clipped into the frame 38 via detent connections 40, merely suggested here. It is also conceivable to clamp the housing 14 into the frame 38; this creates a nonpositive connection between the housing 14 and the frame 38 as a result of frictional engagement.

What is claimed is:

1. An optical sensor for detecting wetting of a surface in a motor vehicle, the optical sensor comprising a measuring segment which has at least one transmitter of electromagnet waves and at least one receiver of electromagnetic waves and in which a windshield is disposable so that when a layer of moisture forms on the windshield upon wetting from precipitation a wave propagation between said at least one transmitter and said at least one receiver changes and an output signal generated by said receiver changes; a housing disposable on an inside of the windshield and having a bottom face adapted to be in physical contact with the windshield, said bottom face of said housing being oval.

2. An optical sensor as defined in claim 1, and further comprising a circuit board which has a contour selected from the group consisting of a trapezoidal contour and a rhomboid contour and mounting electronic and/or optical components of the sensor.

3. An optical sensor as defined in claim 2, wherein said circuit board has a longitudinal axis which corresponds to a diameter of a great circle of said oval bottom face of said housing, and a transverse axis which corresponds to a diameter of a small circle of said oval bottom face of said housing.

4. An optical sensor as defined in claim 1, and further comprising an optical waveguide which is adapted to be arranged in physical contact with the windshield and closes said housing.

5. An optical sensor as defined in claim 1, and further comprising a transparent adhesive film for securing said housing to the windshield.

6. An optical sensor as defined in claim 1, and further comprising an attaching frame for clipping or clamping the optical sensor to the windshield.

* * * * *